United States Patent
Hall et al.

(10) Patent No.: US 8,751,293 B2
(45) Date of Patent: Jun. 10, 2014

(54) DELIVERING CONTEXTUAL ADVERTISING TO A VEHICLE

(75) Inventors: Martin Hall, Sammamish, WA (US); Ali Khan, Duvall, WA (US); Mark McNulty, Renton, WA (US); Zhangwei Xu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 900 days.

(21) Appl. No.: 12/466,117

(22) Filed: May 14, 2009

(65) Prior Publication Data

US 2010/0293033 A1    Nov. 18, 2010

(51) Int. Cl.
G06Q 30/00    (2012.01)
G06Q 90/00    (2006.01)

(52) U.S. Cl.
CPC ....................................... G06Q 90/00 (2013.01)
USPC ....................................................... 705/14.1

(58) Field of Classification Search
CPC ....................................................... G06Q 90/00
USPC ....................................................... 705/14.1
See application file for complete search history.

(56) References Cited

U.S. PATENT DOCUMENTS

| | | | |
|---|---|---|---|
| 6,526,335 B1 * | 2/2003 | Treyz et al. ........................ 701/1 |
| 6,754,485 B1 | 6/2004 | Obradovich et al. | |
| 7,129,825 B2 | 10/2006 | Weber | |
| 2002/0184091 A1 | 12/2002 | Pudar | |
| 2005/0102074 A1 | 5/2005 | Kolls | |
| 2007/0113243 A1 | 5/2007 | Brey | |
| 2008/0221753 A1 | 9/2008 | Kellner et al. | |
| 2008/0288406 A1 | 11/2008 | Seguin et al. | |
| 2008/0319659 A1 | 12/2008 | Horvitz et al. | |

OTHER PUBLICATIONS

NAVTEQ, "Garmin Selects NAVTEQ for First Advertising Supported Real-Time Traffic Delivery", Retrieved at <<http://www.automotix.net/news/20080910/aqw534_1.html>>, Sep. 10, 2008, pp. 2.
Squatriglia, Chuck, "Microsoft Wants Sync to Control Much More than Gadgets", Retrieved at <<http://blog.wired.com/cars/2008/02/microsoft-wants.html>>, Feb. 29, 2008, pp. 6.
Konrad, Rachel, "Meet the Future: Our Cars, Ourselves", Retrieved at <<http://news.cnet.com/Meet-the-future-Our-cars,-ourselves/2009-1082_3-268896.html>>, Jun. 22, 2001, pp. 5.

* cited by examiner

*Primary Examiner* — Daniel Lastra
(74) *Attorney, Agent, or Firm* — John Jardine; Andrew Sanders; Micky Minhas

(57) ABSTRACT

Systems and methods are provided for delivering contextual advertising to a vehicle. An example system may include a profiler module executed by an onboard computing device of the vehicle, and configured to aggregate vehicle event data from a plurality of vehicle-based event sources, and to develop user profile data based on the vehicle event data. A communication agent may also be executed by the onboard computing device, and configured to transmit the user profile data to an advertising service executed on an advertising server via a communication network. The communication agent may also be configured to retrieve an advertisement from the advertising service. The advertisement may be selected based on content of the user profile data. The system may also include an interface module executed by the onboard computing device, and configured to present the advertisement via a display, and/or speaker associated with the onboard computing device.

18 Claims, 2 Drawing Sheets

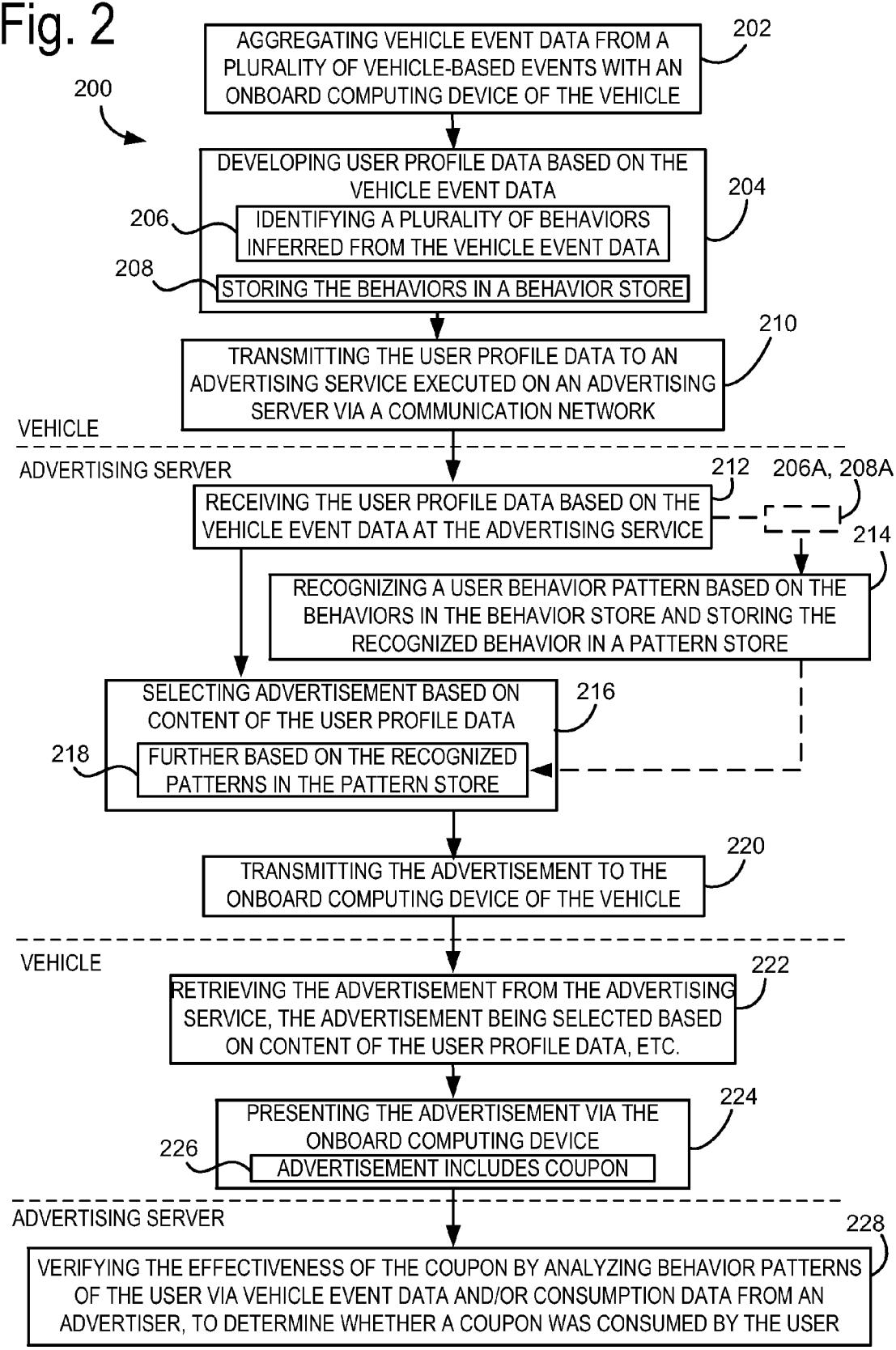

DELIVERING CONTEXTUAL ADVERTISING TO A VEHICLE

BACKGROUND

Today, drivers frequently encounter advertising from sources such as roadside signs and car radios. These advertising sources suffer from the drawback that they cannot be tailored to each driver's unique circumstances. Some car navigations systems today include pre-placed point of interest (POI) messages in the navigation directions when a driver approaches preselected vendor locations. While these messages are delivered based on each vehicle's detected location, sometimes the message can be delivered under circumstances that render the message useless or annoying to the user. For example, a driver who has just stopped at a coffee shop may be presented with a message a few minutes later informing him that he is approaching another coffee shop. This can result in ineffective advertisements that reduce the advertiser's return on investment, and degrade the driver's experience.

SUMMARY

Systems and methods are provided for delivering contextual advertising to a vehicle. An example system may include a profiler module executed by an onboard computing device of the vehicle, and configured to aggregate vehicle event data from a plurality of vehicle-based event sources, and to develop user profile data based on the vehicle event data. A communication agent may also be executed by the onboard computing device, and configured to transmit the user profile data to an advertising service executed on an advertising server via a communication network. The communication agent may also be configured to retrieve an advertisement from the advertising service. The advertisement may be selected based on content of the user profile data. The system may also include an interface module executed by the onboard computing device, and configured to present the advertisement via a display, and/or speaker associated with the onboard computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a flowchart illustrating an example embodiment of a method for delivering contextual advertising to a vehicle.

DETAILED DESCRIPTION

Figure 1:
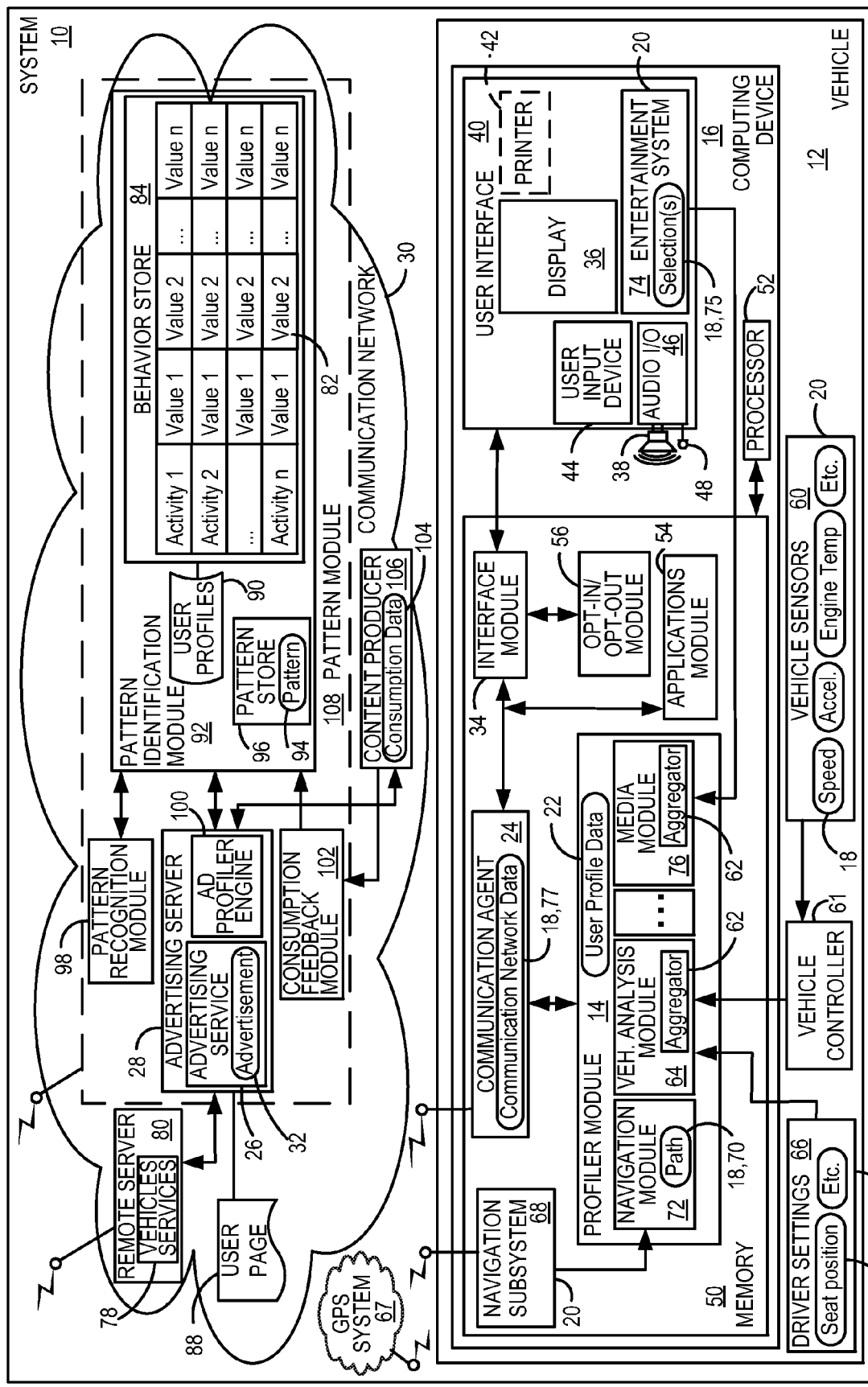
FIG. 1 is a schematic view illustrating an example embodiment of a system for delivering contextual advertising to a vehicle.

FIG. 1 is a schematic diagram illustrating an example system 10 for delivering contextual advertising to a vehicle 12, in accordance with the present disclosure. The system 10 may include a profiler module 14 executed by an onboard computing device 16 of the vehicle 12. The profiler module 14 may be configured to aggregate vehicle event data 18 from a plurality of vehicle-based event sources 20. The profiler module 14 may also be configured to develop user profile data 22 based on the vehicle event data 18.

A communication agent 24 may also be executed by the onboard computing device 16. The communication agent 24 may be configured to transmit the user profile data 22 to an advertising service 26 executed on an advertising server 28 via a communication network 30. The communication agent 24 may also be configured to retrieve an advertisement 32 from the advertising service 26. The advertisement 32 may be selected based on content of the user profile data 22.

An interface module 34 may also be executed by the onboard computing device 16, and may be configured to present the advertisement 32 via an output device such as a display 36 and/or a speaker 38 associated with the onboard computing device 16. The interface module 34 may be operatively coupled to a user interface 40. The user interface 40 may be located such that the display 36 may be visible to the driver of the vehicle 12, and/or such that the speaker 38 may be heard by the driver. In some examples, the user interface 40 may be located on, or built into, a dashboard of the vehicle 12. In other examples, the user interface 40 may be located in another position viewable by passengers in the rear seats of the vehicle, such as in a ceiling or on a rear surface of the front seats of the vehicle. With such a configuration, advertisements may be designated by an advertiser for presentation only to front seat passengers or only to rear seat passengers, if desired.

The user interface 40 may include various mechanisms, or components, that may be configured to deliver various content items, such as the advertisement 32, to the user. The various mechanisms may include the display 36, or the speaker 38, as mentioned, or in some cases the user interface 40 may include a printer 42, or other output device. The printer 42 may enable the user to print out the advertisement 32. In some cases, the advertisement 32 may be a paper coupon that the user, i.e. the driver, may redeem at a vendor of a good, or a service along the driver's route of travel. In other cases, the advertisement 32 may be a paperless coupon. In such cases, the user interface 40 may provide information to the user, such as a number, or a key word, via the display 36, or the speaker 38, to enable the user to redeem the coupon by providing the information to the vendor. In other embodiments, the coupon may be transmitted, wirelessly, or by email for example, to a user's portable device, such as a mobile phone, so that the user may access the coupon at the point of redemption.

In addition, advertisement 32 may include other mechanisms besides a coupon to increase its utility to the user. For example, the advertisement may include a call selector enabling the user to initiate a voice call to an advertiser designated telephone number, via an in-car telephone or other connected mobile telephone. In addition, a map selector may be provided in the advertisement 32 to enable a user to cause the navigation subsystem 20 to present a map to an advertiser designated location. Further, the advertisement may include an associated save/email selector by which a user may save the advertisement to a data store or email the advertisement to a designated account, for future reference. It will be appreciated that the call selector, map selector, and save/email selector may be implemented, for example, as hyperlinks, buttons, speech selectors configured to respond to speech commands, or other suitable input selector types.

The user interface 40 may include a user input device 44, such as a keypad, touch screen, etc., that may be configured to enable the user to input various data, and/or to interact with the onboard computing device 16. The user interface 40 may also include an audio input/output device 46 including an associated microphone 48 and speaker 38. The audio input/output device 46 may be configured to enable audio input such as voice command input via microphone 48 and to enable audio output, such as discussed earlier, via the speaker 38.

In some examples, the profiler module 14, the communication agent 24, and the interface module 34, may be included in a memory 50 resident in the computing device 16. As stated, the computing device 16 may be onboard the vehicle 12. In some cases the computing device 16 may be built into the vehicle 12. In other cases, the computing device 16 may be added to the vehicle 12 as an aftermarket product. In still other cases, the computing device 16 may be portable, and may be configured to be brought into, and removed, from the vehicle 12. Various other software components such as those illustrated in FIG. 1 other components to carry out the functions described herein may also be included in the memory 50 of computing device 16. It will be appreciated that such programs may be stored on a mass storage device associated with the computing device and loaded into memory for execution by a processor 52. The processor 52 may take the form of a central processing unit (CPU), or other suitable controller for executing the instructions.

The computing device 16 may also include an applications module 54. The applications module 54 may be configured to run, and/or enable execution of one or more applications by the computing device 16 from the vehicle 12. The one or more applications may be resident in the computing device 16. The applications may also, or instead, be executable on remote server coupled with the computing device 16. The applications may be, for example, web applications available via one or more web services included in the communication network 30, via the communication agent 24. In some cases, the one or more web services may be provided by a third party service provider.

The computing device 16 may also include an opt-in/opt-out module 56. In some examples, the opt-in/opt-out module 56 may have a default setting such that the user may make a selection using the user interface 40 to opt-in to enable one or more aspects of the system 10, such as tracking of the user's activities and delivery of advertisements. In this way, collection of such information is under the control of the user.

Returning again to the discussion of the plurality of vehicle-based event sources 20, which may provide the vehicle event data 18 to develop the user profile data 22, as described, the vehicle-based event sources 20 may be onboard, or partially, onboard the vehicle 12. In one example, vehicle-based event source 20 may include one or more vehicle sensors 60. With such a configuration, the vehicle event data 18 may include, for example, vehicle diagnostic data that may be detected by the vehicle sensors 60. The vehicle sensors 60 may sense various vehicle conditions, including, without limitation, a vehicle operating condition such as vehicle speed, vehicle acceleration, engine temperature, oil levels, oil pressure, fuel level, coolant level, brake fluid level, battery charge level, tire pressure, or a vehicle component condition indicating that a vehicle component such as a tire, belt, filter, wiper, etc., is worn or needs replacement. The vehicle sensors 60 may be coupled with a vehicle controller 61 that, in some cases, may be configured to control various engine operating parameters. In some examples, the event data 18 may be aggregated by an aggregator 62 that may be included in a vehicle analysis module 64 that may, in turn, be included in the profiler module 14. In other examples, the event data 18 may be interpreted, and/or compiled, and/or otherwise transformed from one data form to another, using components not illustrated in this example, in order to develop the user profile data 22.

Another of the one or more vehicle-based event sources 20 may include driver settings 66. In such cases, the vehicle event data 18 may include, for example, seat position settings, steering wheel position settings, climate control settings, and the like. In some examples, the vehicle event data 18 provided by driver settings 66 may also be aggregated by the aggregator 62 in the vehicle analysis module 64. In other examples, the vehicle event data 18 may be aggregated with a larger group of vehicle event data 18 by, for example the profiler module 14. The larger group of vehicle event data 18 may include other vehicle event data 18, such as described below. It will be understood that numerous types, and quantities, of vehicle event data 18, not specifically described herein, may also be included in example systems without departing from the scope of the present disclosure.

Another example vehicle-based event source 20 may include a global positioning satellite (GPS) 67 enabled navigation subsystem 68. Thus, the vehicle event data 18 may include vehicle usage data, which may indicate a path 70 traveled by the vehicle 12 over time as sensed by the navigation subsystem 68. The path 70 may be received by a navigation module 72 which may be included in the profiler module 14.

Another example vehicle-based event source 20 may include, for example, a vehicle entertainment system 74. With such a configuration, the vehicle event data 18 may include entertainment system usage data, such as entertainment selections 75 made by the user. The entertainment selections 75 may include, for example, a genre, artist, title, program name, broadcasting station, etc., for each of multiple media items (audio or video media tracks, streams or other programs) played by the driver, and/or play counts and play frequencies for each media item. The vehicle entertainment system 74 may be integrated with the user interface 40 as illustrated, or separate from the user interface 40. The speaker 38 may be included as part of the vehicle entertainment system 74, i.e., as a built-in speaker in the vehicle. In the case of a vehicle 12 equipped to provide video entertainment for passengers, the type of video, or movie, or the like, watched from the vehicle 12 may be included as the vehicle event data 18. In some examples, the selections 75 may be aggregated by an aggregator 62 that may be included in a media module 76 that may, in turn, be included in the profiler module 14.

Another example vehicle-based event source 20 may include the communication agent 24. With such a configuration, the vehicle event data 18 may include communication network data 77 indicating communications between the communication agent 24 and one or more vehicle services 78, via the communication network 30. The vehicle services 78 may include for example, one or more of an email service, a calendar service, a map service, and a contacts service. The one or more vehicle services 78 may be executed by a remote server 80. In some cases, the communication network data 77 may be included, and/or generated from use of the applications executed by the applications module 54.

The profiler module 14 may be configured to develop the user profile data 22, at least in part, by identifying a plurality of behaviors 82 inferred from the vehicle event data 18. The behaviors may be inferred by comparing the vehicle event data to predefined behavior definitions to determine whether one or more of the behaviors has occurred from the vehicle event data. The profiler module 14 may also be configured to develop the user profile data 22, by storing the behaviors 82 in a behavior store 84. The illustrated example shows the behavior store 84 included in the communication network 30. In other examples, the behavior store 84 may be resident in the computing device 16, or in another location.

The system 10 may be configured to enable the user to provide information via, for example, a user page 88 on a web site. The information provided may be included in a user profile 90, and may be included in a pattern identification module 92. The pattern identification module 92 may use the behaviors 82 stored in the behavior store 84 with, or without, the user profile 90 to identify one or more behavior patterns 94 exhibited by the user. The behavior patterns 94 may be stored in a pattern store 96. Examples of specific behaviors 82 and associated behavior patterns 94 are given below in the Example Use Case Scenario.

The system 10 may also include a pattern recognition module 98 configured to recognize when the user is in a recognizable behavior pattern 94 based on the behaviors 82 stored in the behavior store 84, and/or based on the behavior patterns 94 in the pattern store 96. An ad profiler engine 100 may be configured to select the advertisement 32 based on the recognized user behavior pattern 94.

The system 10 may include a consumption feedback module 102 configured to verify the effectiveness of the advertisement 32 by analyzing behavior patterns 94 of the user via vehicle event data 18, and/or consumption data 104 from a content producer 106, such as an advertiser, to determine whether the advertisement 32 was consumed by the user. As discussed, the advertisement 32 may be a coupon, and consumption may be verified upon redemption of the coupon with a vendor, which may be the advertiser. The vendor may be located along the path 70 of travel of the vehicle 12. The analysis of the behavior patterns 94 may include, for example, analysis of the path 70 of travel of the vehicle 12, to determine whether the driver stopped at a location for which the coupon was designated for redemption. In other cases, sales data or coupon data may be received from the vendor to verify that the coupon was redeemed.

In some examples, the pattern store 96 may be further configured to store the user behavior pattern 94 as a confirmed user behavior pattern 94 after the effectiveness of the advertisement 32 is verified by the consumption feedback module 102. In addition, in some cases, the ad profiler engine 100 may be further configured to subsequently select a second advertisement 32 based on the recognized user behavior pattern 94, after the confirmed user behavior pattern 94 is stored in the pattern store 96.

The pattern identification module 92, and/or the pattern recognition module 98, and/or the advertising server 28, and/or other components, may be included in a pattern module 108. In some examples, the pattern module 108 may be configured to be executed by a remote server in communication with the computing device 16. In other examples, the pattern module 108 may be resident on the computing device 16.

FIG. 2 is a flowchart illustrating an example embodiment of a method 200 for delivering contextual advertising to a vehicle according to the present disclosure. Method 200 may be implemented using the systems and devices described above, or using other suitable hardware. The method 200 may include, at 202, aggregating vehicle event data from a plurality of vehicle-based events with an onboard computing device of the vehicle. The vehicle event data may include one or more of vehicle diagnostic data, vehicle usage data, communication network data, driver setting data of the vehicle, and entertainment system usage data, and may be aggregated from various vehicle subsystems as described above.

The method 200 may also include, at 204, developing user profile data based on the vehicle event data. Developing the user profile may include, at 206, identifying a plurality of behaviors inferred from the vehicle event data, and at 208, storing the behaviors in a behavior store. It will be appreciated that steps 206 and 208 may alternatively or further be performed at an advertising service executed on an advertising server, following step 212, as indicated below. The method 200 may also include, at 210, transmitting the user profile data to an advertising service executed on an advertising server via a communication network.

At 212, the method may include receiving, at the advertising service executed on the advertising server, the user profile data based on vehicle event data aggregated by the on-board computing device of the vehicle. As discussed above, it will be appreciated that the program logic and data store for identifying behaviors and storing them in a behavior store may be on the advertising server instead of or in addition to being on the vehicle, and thus at 206A and 208A, the method may further include identifying a plurality of behaviors inferred from the vehicle event data and storing the behaviors in a behavior store, at the advertising service on the advertising server. At 214, the method may further include recognizing a user behavior pattern based on behaviors in the behavior store. The pattern recognition may occur as described above, and further as illustrated below in the example use case scenario.

At 216, the method may include selecting an advertisement based on content from the user profile data. In some embodiments, the process flow may proceed directly from step 212 to 216 without recognizing patterns at 214. However, in other embodiments, the control flow may proceed from 212 through 206A, 208A, and/or 214 and thus it will be appreciated that the selection of advertisements at 216 may be further based on the recognized patterns in the pattern store, as indicated at 218. At 220, the method may include transmitting the advertisement from the advertising service on the advertising server to the onboard computing device of the vehicle for display.

The method 200 may also include, at 222, retrieving an advertisement from the advertising service, the advertisement being selected based on content of the user profile data. In addition, the method 200 may also include, at 224, presenting the advertisement via an output device of the onboard computing device, such as a display or speaker.

In some examples, the advertisement may include a coupon, as indicated at 226. The coupon may be for use at a location along an established route included within a recognized pattern of the driver. In such cases, the method 200 may also include, at 228, verifying the effectiveness of the coupon by analyzing behavior patterns of the user via vehicle event data, and/or consumption data, from an advertiser, to determine whether the coupon was consumed, i.e., redeemed, by the user. The method 200 may also include retrieving a second advertisement from the advertising service. The second advertisement may be selected based on content of the user profile data, and further based on the effectiveness of the coupon being verified.

Example Use Scenario

Jim purchased a new SUV for his family three months ago. At the dealership, Jim was informed that he would not have to service his SUV for at least 6 to 9 months given the typical use of other consumers, and based on his own descriptions of what he and his family planned to do. Over the past three months, however, the family used the SUV often. They have driven the car in multiple climates, and they have driven the car quite intensively.

Jim is new to owning SUVs, and he normally tends to ignore the technical aspects of car maintenance. Jim's in-car system is configured to capture diagnostics regarding components of the car including the brakes, the tires, the oil, fluids, etc., and base telemetry regarding how the car has been driven. The next weekend when Jim gets into the SUV to get gas for the family's next trip, he notices that the in-car display has indicated that his engine coolant is low. Alongside the indicator, the systems and methods described above deliver to Jim an advertisement from his local auto store that is just down the street. The advertisement is a coupon is for 20% off a bottle of anti-freeze engine coolant.

During the week, Jim drives the SUV to work. Jim works as an architect, and visits many job sites. The SUV makes access to these sites very easy, and allows him to bring along his co-workers, and some equipment. When Jim is alone on a work trip though, he typically listens to rock music. AC/DC is Jim's favorite band, and not a day goes by that he does not listen to them on his entertainment system.

When Jim gets into the SUV one day, and selects an AC/DC song for his entertainment system to play, he is greeted with an audio advertisement letting him know that a new AC/DC album is out today, provided by the systems and methods discussed above. Jim is pleased for he did not realize the new album was out so soon. He, therefore, makes it a point to stop by his favorite music store to buy the album. Alternatively, the advertisement might include a link to enable Jim to purchase the new album online, for download directly to the vehicle's entertainment system.

After heading out, Jim gets a call letting him know that previously set plans have changed, and that he'll be going to Portland instead of Seattle for a site visit. After inputting the address into the navigation system, Jim listens to his music while driving. Once Jim crosses the city line into Portland, the above described systems and methods greet him with another audio advertisement letting him know that AC/DC is performing a surprise concert at a local downtown night club. Jim checks his schedule and realizes that he would have time to attend the show, and makes it a point to see if his coworkers at the site might want to attend as well.

As Jim is driving to the job site, he is presented with an audio cue that prompts him to look at his navigation system. The above described systems and methods have added the name of a coffee shop in the vicinity to his route display. Included on the display is a description of the store, and a 10% off coupon when ordering a large coffee. Jim is thankful for this as his morning routine is to stop off at a coffee when going on a long trip, and saving money is just icing on the cake.

The above scenarios illustrate example outputs that may be enabled by capturing predetermined types of data and learning an inferred behavior pattern, and/or a confirmed behavior pattern in accordance with various example embodiments described above. By capturing car telemetry data indicating Jim's driving type and preferences, and/or car diagnostics data, Jim is provided a targeted and contextual advertisement. This may be expanded to cover other aspects of the vehicle condition, and also pre-emptive maintenance based upon expected wear and tear and Jim's driving behavior patterns, and in some cases, the driving behavior patterns other operators of the vehicle as well.

It will be appreciated that the system may be configurable to enable a user to enter preferences on the types of advertisements that will be delivered to the vehicle. For example, in the above scenario Jim, being a new car owner, and a coffee and music fan, might have entered user preferences indicating that the system should send him relevant advertisements for parts and services for his new SUV, for coffee shops that are along his route of travel, and for upcoming concerts for bands like AC/DC that he often listens to, but not to display advertisements for other goods or services. This has the effect of reducing unwanted advertising for the user, making the advertisements feel less like advertisements to the user and more like useful information, and also potentially increases the effectiveness of each advertisement displayed.

In order to ensure accurate delivery of advertising, and to provide for both real-time and predictive situations, the vehicle diagnostic and telemetry data may be tracked in real time and stored in a user profile. Over time, and/or with sufficient data, the system may present advertisements in response to recently detected real time vehicle event data, and also statistically predict both vehicle and user requests, and deliver the appropriate advertising in response. In some cases, more recently identified behavior patterns may be given more weight in the selection process so that newly exhibited behaviors and preferences take precedence over prior behavior patterns. Thus, if Jim one day stops listening to AC/DC and begins to listen to new band, then advertising based on the new band can selected for display.

The above scenario also illustrates how Jim's listening habits and music preferences may be added to his profile. In one of the scenarios discussed above, Jim was delivered a form of advertising about his favorite band, namely that the band had a new album out, and that the band was performing a concert in a location where Jim was driving. The information was contextual in nature, and customized for Jim. When presented with advertising in such example cases, Jim may perceive higher value from the advertisement and find it more relevant and meaningful to him. This may in turn increase the advertisement's effectiveness for the advertiser, in converting Jim into a purchaser of the advertised goods and services. In this manner, it will be appreciated that the user is not forced to input any special preferences to receive the contextual advertising, rather after opting in to use the system, the user's actions are observed and patterns recognized over time that become the basis for selection of advertising.

In addition to media items such as music tracks, other embodiments may track user preferences for other forms of media items, for example, movies and games. This may enable a level of interactive information and advertising that may be appreciated by a user without feeling intrusive.

The above scenario also illustrates how the systems and methods described above may be used to provide the user with advertising regarding a user's food & drink preferences. For example, the user may be given direct advertising focused around an anticipated request, such as an outlet of a frequented coffee store in a different city at a time when the user typically visits a coffee store in the user's home city, as in the above example. The data used to detect this pattern may be from previous vehicle stops in the vicinity of a given establishment at a certain time of day, user search queries conducted via a navigation module or other computing device in the vehicle, etc. This may allow advertisers to reach customers more effectively, and may provide the advertisers a higher rate of return for their advertising investment.

For example, by monitoring the types of establishments a user frequents, and/or the frequency in which they do so, the systems and methods described above may build a more powerful targeting matrix. Over time, a user's profile may be made more comprehensive, thus improving the targeting of advertising. In this instance, data regarding favorite locations, common trip lengths, and time and frequency of stops, may help build behavior patterns that may create a more accurate picture of a user. In some examples, demographic data may be added to a matrix to target advertisements not just based on current actions, but also on actions and habits of others with similar requests, and wants.

It will be appreciated that the systems and methods described above may be employed to deliver contextually relevant advertising to a user of a vehicle based on events that occur at the vehicle, in a manner that is not intrusive to the user. By recognizing patterns in vehicle-based events and selecting appropriate advertisements for display based on the recognized patterns, both the utility of the advertisements to users and their effectiveness to advertisers may increase.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, enhanced mobile telephone device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above. Some of these instructions may be grouped into modules or other program units. It will be appreciated that the grouping of such instructions into modules herein is merely exemplary, and that other groupings and configurations are possible.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A system for presenting contextual advertising to a user of a vehicle, comprising:
   a computing device onboard the vehicle;
   a profiler module executed within the onboard computing device, the profiler module configured to receive a travel path of the vehicle and to aggregate vehicle event data from a plurality of vehicle-based event sources, and further configured to develop user profile data by inferring a plurality of behaviors of the user from the vehicle event data, and to store the behaviors in a behavior store external to the vehicle;
   a communication agent executed within the onboard computing device and configured to transmit the user profile data, via a communications network, to an advertising service executed on an advertising server and to retrieve an advertisement from the advertising server, the advertisement being selected based on the travel path together with the behaviors of the user stored in the behavior store; and
   an interface module executed within the onboard computing device and configured to present the advertisement via a display or speaker in the vehicle.

2. The system of claim 1 wherein the computing device is a first computing device, the system, further comprising:
   a second computing device external to the vehicle; and
   a pattern recognition module executed within the second computing device and configured to recognize a user behavior pattern based on the behaviors stored in the behavior store;
   an ad profiler engine executed within the second computing device and configured to select the advertisement based on the recognized user behavior pattern.

3. The system of claim 2, further comprising:
   a consumption feedback module executed within the second computing device and configured to verify an effectiveness of the advertisement by analyzing behavior patterns of the user via vehicle event data and/or consumption data from an advertiser, in order to determine whether the advertisement was consumed by the user; and
   a pattern store external to the vehicle, configured to store the user behavior pattern, and further configured to store the user behavior pattern as a confirmed user behavior pattern after the effectiveness of the advertisement is verified by the consumption feedback module;
   wherein the ad profiler engine is further configured to subsequently select a second advertisement based on the recognized user behavior pattern after the confirmed user behavior pattern is stored in the pattern store.

4. The system of claim 1, wherein the vehicle-based event sources include one or more vehicle sensors, and the vehicle event data includes vehicle diagnostic data detected by the one or more vehicle sensors.

5. The system of claim 1, wherein the vehicle-based event sources include a global positioning satellite (GPS) enabled navigation subsystem, and the vehicle event data includes vehicle usage data indicating a path traveled by the vehicle over time as sensed by the navigation subsystem.

6. The system of claim 1, wherein the vehicle-based event sources include the communication agent, and wherein the vehicle event data includes communication network data indicating communications between the communication agent and one or more vehicle services via the communication network, the one or more vehicle services executed by a remote server.

7. The system of claim 1, wherein the vehicle-based event data includes driver setting data of the vehicle.

8. The system of claim 1, wherein the vehicle-based event sources include a vehicle entertainment system, and the vehicle event data includes entertainment system usage data.

9. The system of claim 2, wherein the advertisement is a coupon, and further comprising:
   a consumption feedback module executed within the second computing device and configured to verify an effectiveness of the coupon by analyzing behavior patterns of the user via vehicle event data and/or consumption data from an advertiser, to determine whether the coupon was consumed by the user.

10. A method for presenting contextual advertising to a user of a vehicle, comprising:
    in an onboard computing device of the vehicle, receiving a travel path of the vehicle and aggregating vehicle event data from a plurality of vehicle-based events;
    developing user profile data in the onboard computing device by inferring a plurality of behaviors of the user from the vehicle event data;
    storing the behaviors of the user in a behavior store external to the vehicle;
    transmitting the user profile data to an advertising service executed on an advertising server via a communication network;

retrieving an advertisement from the advertising service, the advertisement being selected based on the travel path together with the inferred behaviors of the user stored in the behavior store; and presenting the advertisement via the onboard computing device.

11. The method of claim 10 wherein the computing device is a first computing device, the method further comprising:

in a second computing device external to the vehicle, recognizing a user behavior pattern based on the behaviors stored in the behavior store;

wherein the advertisement is further selected based on the recognized user behavior pattern.

12. The method of claim 10, wherein the vehicle event data includes one or both of vehicle diagnostic data detected by one or more vehicle sensors, and driver setting data of the vehicle.

13. The method of claim 10, wherein the vehicle event data includes vehicle usage data indicating a path traveled by the vehicle over time as sensed by a global positioning satellite (GPS) enabled navigation subsystem of the vehicle.

14. The method of claim 10, wherein the vehicle event data includes communication network data indicating communications between a communication agent and one or more vehicle services executed by a remote server, via the communication network, the vehicle services including one or more of an email service, a calendar service, a map service, and a contacts service.

15. The method of claim 10, wherein the vehicle event data includes entertainment system usage data.

16. A method for providing contextual advertising to a user of a vehicle, comprising:

at an advertising service executed on an advertising server, receiving user profile data based on vehicle event data aggregated by an onboard computing device of the vehicle, the user profile data including a plurality of behaviors of the user inferred from the vehicle event data and stored in a behavior store external to the vehicle;

at the advertising service executed on the advertising server, recognizing a user behavior pattern based on behaviors of the user stored in the behavior store;

storing the recognized behavior pattern in a pattern store external to the vehicle;

selecting an advertisement based on a travel path of the vehicle, and further based on the recognized patterns stored in the pattern store; and transmitting the advertisement to the onboard computing device of the vehicle for display.

17. The method of claim 16 wherein the advertisement includes a coupon for use near the vehicle location or along a travel path of the vehicle.

18. The method of claim 17, further comprising:

verifying an effectiveness of the coupon by analyzing behavior patterns of the user via vehicle event data and/or consumption data from an advertiser, to determine whether the coupon was consumed by the user; and selecting and transmitting a second advertisement to the vehicle, the second advertisement being selected based on content of the user profile data, and further based on the effectiveness of the coupon being verified.

* * * * *